United States Patent [19]

Julian et al.

[11] 4,288,504

[45] Sep. 8, 1981

[54] SEALED BATTERY CABLE TERMINATION

[76] Inventors: Victor J. Julian, 2400 Belvue, Westchester, Ill. 60153; Kenneth A. Julian, 409 Suffolk La., Oak Brook, Ill. 60521

[21] Appl. No.: 170,846

[22] Filed: Jul. 21, 1980

[51] Int. Cl.[3] .......... H01M 2/30

[52] U.S. Cl. .......... 429/179; 429/181; 429/185; 339/29 B; 339/116 R; 339/232

[58] Field of Search .......... 429/179, 181, 185, 178, 429/183, 57, 65; 339/224, 234, 263 B, 276 T, 232, 28, 29 B, 116 R

[56] References Cited

U.S. PATENT DOCUMENTS

| | | | |
|---|---|---|---|
| 3,413,593 | 11/1968 | Schaefer | 339/232 |
| 3,928,079 | 12/1975 | Jennings et al. | 429/179 |
| 3,973,820 | 8/1976 | Benson | 339/239 |
| 4,049,335 | 9/1977 | Julian et al. | 339/224 |
| 4,124,367 | 11/1978 | Miller | 339/232 |
| 4,156,552 | 5/1979 | Wilson et al. | 339/232 X |

*Primary Examiner*—Anthony Skapars
*Attorney, Agent, or Firm*—Edmond T. Patnaude

[57] ABSTRACT

A terminal of a storage battery has an upstanding boss surrounded by an annular groove and a terminal plate has an embossment which fits against said boss and a resilient sealing being which is compressed into the groove by a bolt which extends through an opening through said embossment into a threaded hole through said boss.

8 Claims, 6 Drawing Figures

SEALED BATTERY CABLE TERMINATION

The present invention relates in general to a cable termination for making electrical connections to wet-cell storage batteries, and it relates in particular to a new and improved sealed connection between a cable and a storage battery.

BACKGROUND OF THE INVENTION

U.S. Pat. No. 4,049,335 discloses battery cable termination for use with maintenance-free storage batteries having threaded stud terminals. Copending application Ser. No. 149,346 filed May 13, 1980, discloses improvements on the said terminations wherein the cable terminations are sealed to the studs to prevent acidic fumes which escape from the battery from corroding the termination.

It would be desirable to provide a battery cable termination which enables a sealed connection to a side mounted battery terminal of the type having a threaded hole therein, and it would be further desirable to construct such a termination to enable its use in a stacked connection wherein a plurality of cable terminations are sealably connected to a single battery terminal.

SUMMARY OF THE INVENTION

Briefly, there is provided in accordance with the teachings of the present invention a new and improved connection between a terminal of a storage battery and a battery cable termination wherein the termination includes a resilient sealing bead which is compressed into an annular groove in the battery terminal by a threaded bolt which extends through an apertured embossment in the termination into a threaded hole in the battery terminal.

In a preferred embodiment of the invention the cable termination includes an integral upstanding flange which shrouds the distal end of the bolt and over which a sealing cap is snapfitted. When this embodiment is used as part of a stack, the lower sealing bead thereon is compressed against the top of the next lower termination to provide a sealed connection thereto.

GENERAL DESCRIPTION OF THE DRAWING

The present invention will be better understood by a reading of the following detailed description taken in wherein.

DETAILED DESCRIPTION OF THE INVENTION

Figure 1:
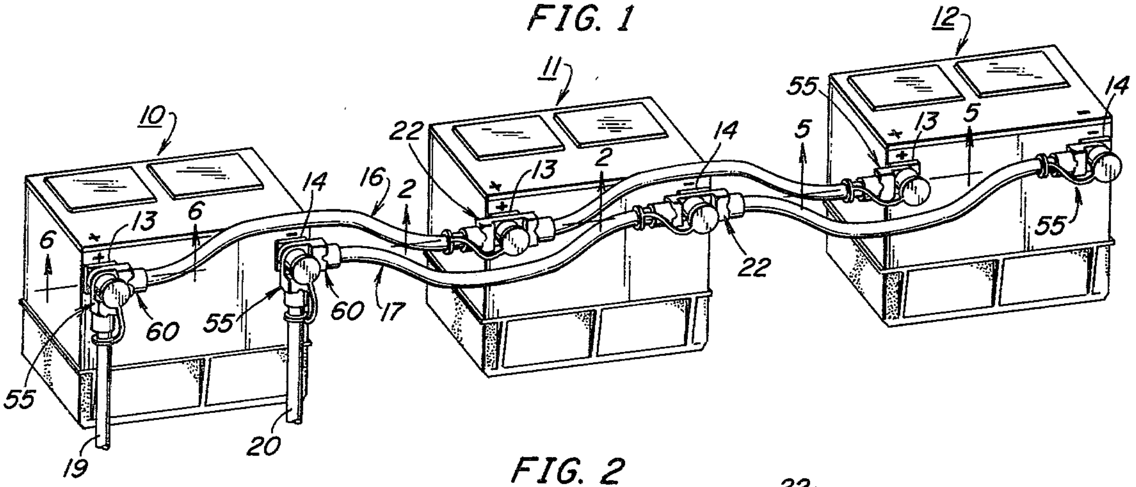
FIG. 1 is a perspective view of three batteries electrically interconnected by termination assemblies embodying the present invention.

Referring to FIG. 1, the invention is illustrated in use with a plurality of wet-cell type storage batteries 10, 11 and 12, respectively having a positive battery terminal 13 and a negative battery terminal 14. The terminals 13 and 14 are identical in construction and are respectively connected to the anode and cathode electrodes (not shown) within the battery casing. The terminals 13 and 14 are located on one vertical side wall of the battery in proximity to the adjacent sides of the battery.

As shown in FIG. 1, the three batteries 10, 11 and 12 are connected in parallel with the three positive terminals 13 connected together by a single battery cable 16 and with the three negative terminals 14 connected together by a single battery cable 17. A pair of power cables 19 and 20, only partially shown, are connected to the terminals 13 and 14 of the battery 10 in stacked relationship with the end terminations of the cables 16 and 17. It will be understood that the cables 19 and 20 are adapted to be connected to the load circuit to be powered by the batteries 10, 11 and 12.

Figure 2:
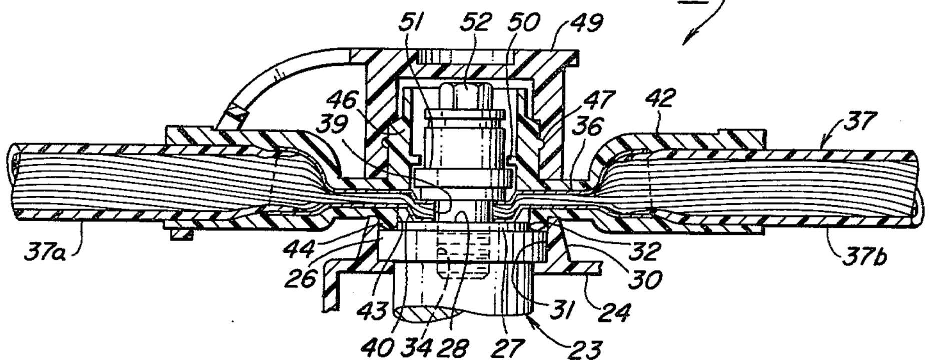
FIG. 2 is a cross-sectioned, elevational view of an in-line cable termination and battery terminal combination embodying this invention.
Figure 3:
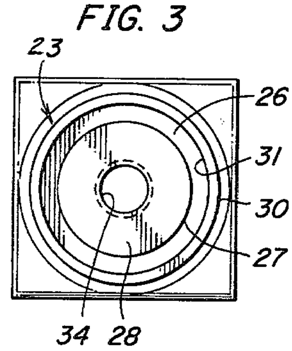
FIG. 3 is a plan view of a battery terminal with which the present invention finds application.
Figure 4:
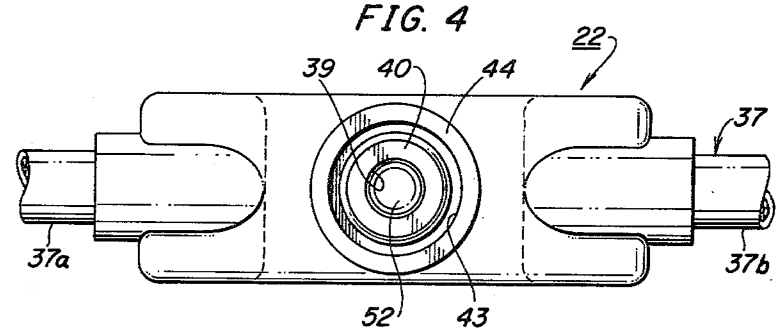
FIG. 4 is a bottom view of the termination shown in FIG. 2.

Referring to FIG. 2, there is shown a sealed, in-line cable termination 22 connected to a battery terminal member 23 extending through a wall 24 of a battery case. As best shown in FIG. 3, the terminal 23 has a cylindrical portion 26 extending outwardly from the wall 24 and a centrally disposed cylindrical boss 27 having a planar face 28 at its distal end. An annular flange 30, which is preferably integral with the wall 24, encircles the terminal 23 and extends outwardly beyond the end face 28 thereof. The flange 30 has a cylindrical inner wall 31 which is spaced from the outer cylindrical wall 32 of the boss 27 to define an annular groove which surrounds the boss 27. An internally threaded, blind hole 34 extends a short distance into the terminal 23 from the outer face 28.

The cable termination 22 is an in-line type of termination and is used for electrically connecting a battery terminal to two other locations. Such a termination may be used, as shown in FIG. 1, for connecting one battery terminal to two other terminals.

The termination 22 is of the basic construction disclosed in U.S. Pat. No. 4,049,335 and thus includes a terminal plate portion 36 connected to a single cable 37 having sections **37*a* and 37*b* extending from oposite sides of the plate 36. As more fully described in the said patent, the plate 36** is formed by inserting the cable through a metal tube and then forging the tube into a generally planar configuration. While this plate construction is preferred, it will be understood that features of the present invention find use with other terminal plate constructions.

An opening 39 extends through the terminal plate 36 in alignment with the threaded hole 34 and the plate 36 is provided with an annular embossment 40 which surrounds the opening 39. The embossment 40 thus provides a depending ring which abuts the face 28 to provide a low ohmic connection thereto, and an annular depression on the top surrounding the opening.

The terminal plate 36 and the adjacent portions of the cable 37 are enclosed in a unitary cover 42 which is resilient plastic molded in place. The cover 42 is provided at the bottom with a circular opening 43 surrounding the embossment 40. An annular resilient lip 44 which surrounds the opening 43 fits into the groove adjacent the boss 27 and is compressed against the terminal when the embossment 40 abuts the end face 28 of the terminal. At the top the cover 42 includes an integral, upstanding sleeve 46 having an external annular bead 47 for snap-locking a cap 49 in place over the sleeve 46. An internal flange 50 overlies an external flange 51 on a terminal bolt 52 to removably capture the bolt 52 in the sleeve 46. The bolt 52 has a threaded shank which is threadedly received in the hole 34.

In order to provide a hermetic seal to entrap any acidic fumes which escape from the battery along the external surface of the terminal 23, the lip 44 is dimensioned relative to the lower face of the embossment 40 and the adjacent surface of the cover 42 so that when the bolt 52 is tightened into the hole 34 the lip 44 is compressed against the annular end surface of the terminal 23 surrounding the boss 27 and expands outwardly against the side of the boss 30 and the side wall 43 of the battery casing flange 30. Moreover, when the embossment 40 abuts the end face 28 of the terminal the outer end of the flange 30 compresses the abutting portion of the cover to provide a second annular seal spaced outwardly from the first. This latter seal prevents the escape of fumes which pass between the battery case and the terminal 23 from escaping to the ambient. In addition to providing a double seal, these compressed resilient portions of the cover exert an outward axial force on the bolt 52 which prevents spurious loosening of the bolt 52 due to vibration and temperature changes.

Figure 5:
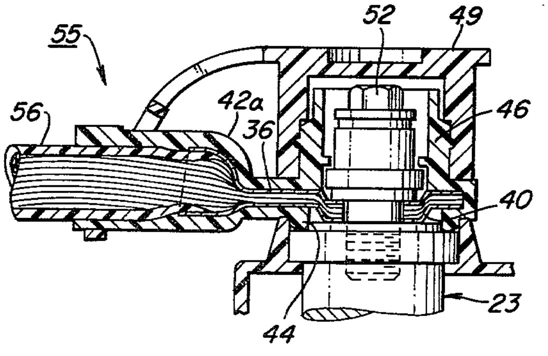
FIG. 5 is a cross-sectioned, elevational view of another cable termination and battery terminal combination embodying this invention.

Referring to FIG. 5, there is shown a sealed, end termination 55 connected to an end of a cable 56. In this embodiment of the invention the termination is essentially the same as the termination 22 and similar parts are identified by like reference characters. It may be seen by inspection of FIG. 5 that the cable 56 does not continue on the opposite side of the termination and the resilient cover 42*a* encloses the distal end of the terminal plate 40. The use of the termination 55 is shown at the right in FIG. 1 to connect the cables to the terminals of the battery 12.

Figure 6:
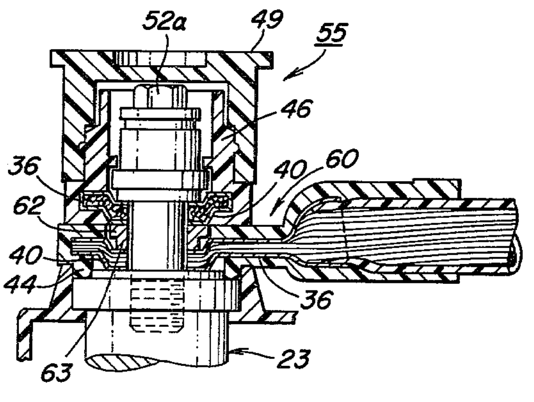
FIG. 6 is a cross-sectional, elevational view of two cable terminations stacked on a battery terminal combination embodying this invention.

Referring to FIG. 6, there is illustrated a stacked connection as shown, for example, on battery 10 in FIG. 1. It incorporates the battery terminal 23 as described in detail in connection with FIG. 2 and the end termination 55 as described in detail in FIG. 5. Moreover, like parts are identified with like reference numerals. Positioned between the terminal 23 and the termination 55 is a stackable, end termination 60.

The termination 60 is very similar to the termination 55 with the upstanding flange 46 omitted and a metal washer 62 tightly fitted into the opening in the top portion of the cover surrounding the bolt receiving opening. The washer 62 has a depending annular part 63 which depends into the recess at the top of the embossment and abuts the terminal plate. The washer 62 may be held in place by the cover or if desired, it may be soldered to the terminal plate. The bolt 52*a* has an elongated shank to accommodate the added thickness of the termination 60. It may be seen that a hermetic seal is effected between the lip 44 on the upper termination and the upper surface of the termination 60.

If desired, the termination 55 shown stacked on the termination 60 in FIG. 6 may be replaced by an in-line termination 22 by substituting the longer terminal bolt 52*a* for the shorter bolt 52. Similarly, the cable may continue through the termination 60 to provide a stackable in-line termination.

The present invention thus provides a system for sealably connecting battery cables to battery terminals by means of terminal bolts threaded into threaded holes in the battery terminals. Moreover, the terminations of the present invention provide external, auxiliary seals, for preventing the release of acidic fumes from the batteries during use thereof. Accordingly, corrosion of the metal parts in the termination assembly is prevented. In addition, spurious loosening of the terminal bolts is also prevented by the sealing structure.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. In combination, a storage battery having a wall formed of an insulating material having a hole therethrough, a metallic terminal extending through said hole in sealing relationship with said wall, said terminal having a cylindrical portion on the external side of said wall, an upstanding flange on said wall surrounding said cylindrical portion and extending outwardly beyond the distal end of said terminal, said terminal having a centrally disposed cylindrical boss defining with said flange an annular open top groove surrounding said boss, said terminal having an internally threaded, axial blind hole opening onto said distal end, an electric cable having a terminal connector affixed thereto, said terminal connector including, a terminal plate having an opening therethrough in alignment with said hole in said terminal, said terminal plate having a depending annular portion surrounding said opening and abutting said distal end of said terminal, a plastic, insulating cover molded directly over said terminal plate and having an annular, resilient lip portion extending into said groove, and a terminal bolt extending through said opening and threaded into said hole and holding said terminal plate in contact with said distal end of said terminal and said lip in compression in said groove.

2. The combination set forth in claim 1 wherein said plastic insulating cover further includes an upstanding, generally cylindrical sleeve having an internal flange therein, and said terminal bolt being provided with a shoulder having an external diameter exceeding the material diameter of said internal flange, and said terminal bolt being disposed within said sleeve with said external flange positioned between said shoulder and said terminal plate.

3. The combination set forth in claim 2 comprising a cap sealably attached over the open end of said sleeve.

4. The combination set forth in claim 1 wherein said cover is compressed against said upstanding flange throughout a continuous area surrounding said terminal to provide an external auxiliary seal for preventing fumes from said battery from escaping to the ambient.

5. The combination set forth in claim 4 wherein said depending annular portion of said terminal plate comprises an embossment, and said terminal plate has an annular recess surrounding said opening on the side thereof opposite said depending annular portion.

6. The combination set forth in claim 5 comprising a metal washer positioned in abutment with said terminal plate against the bottom of said recess.

7. In combination, a storage battery having a wall formed of an insulating material having a hole through, a metallic battery terminal extending through said hole in sealing relationship with said wall, said terminal having a cylindrical portion on the external side of said wall, a continuous, upstanding annular flange on said wall surrounding said terminal, said terminal having an internally threaded, axial blind hole opening onto the external end thereof, an electric cable having a terminal connector affixed thereto, said terminal connector including a terminal plate having an opening therethrough in alignment with said hole in said terminal, said terminal plate abutting said external end of said terminal, a resilient, plastic insulating cover positioned over said plate with openings on opposite side thereof in alignment in said opening, a terminal bolt extending through said openings and threaded into said hole and holding said terminal plate in contact with said external end of said terminal, and said cover being held by said bolt in compression with said upstanding annular flange.

8. The combination set forth in claim 7 wherein said terminal comprises a centrally disposed cylindrical boss defining with said annular flange an annular open top groove surrounding said boss, and said cover having a resilient annular lip portion extending into said groove in sealing relationship with said terminal.

* * * * *

UNITED STATES PATENT AND TRADEMARK OFFICE

CERTIFICATE OF CORRECTION

PATENT NO. : 4,288,504

DATED : September 8, 1981

INVENTOR(S) : Victor J. Julian and Kenneth A. Julian

It is certified that error appears in the above—identified patent and that said Letters Patent is hereby corrected as shown below:

Column 4, line 54, "material" should be -internal-.

Column 5, line 13, "through" should be -therethrough-.

Signed and Sealed this

*First* Day of *December 1981*

[SEAL]

*Attest:*

GERALD J. MOSSINGHOFF

*Attesting Officer* *Commissioner of Patents and Trademarks*